US005737823A

United States Patent [19]

Walker

[11] Patent Number: 5,737,823

[45] Date of Patent: Apr. 14, 1998

[54] TOOL FOR INSTALLING WIRES ON A PUNCH BLOCK

[76] Inventor: Kenneth Walker, 10211 Jefferson Hill Rd., Fairdale, Ky. 40118

[21] Appl. No.: 685,189

[22] Filed: Jul. 18, 1996

[51] Int. Cl.$^6$ .................................................... B23P 23/00

[52] U.S. Cl. .............................. 29/566.4; 29/749; 29/750

[58] Field of Search ................................ 29/33 M, 566.2, 29/566.3, 566.4, 566.1, 750, 751, 758, 749, 752, 755

[56] References Cited

U.S. PATENT DOCUMENTS 4,642,874 2/1987 Litehizer, Jr. .
4,868,976 9/1989 Schiller, Sr. et al. .
5,125,150 6/1992 Meyer .
5,155,907 10/1992 Dornes et al. .
5,165,167 11/1992 Dechelette .
5,205,033 4/1993 Drach .

*Primary Examiner*—A. L. Pitts
*Assistant Examiner*—Christopher Kirkman
*Attorney, Agent, or Firm*—Wheat, Camoriano, Smith & Beres, PLC

[57] ABSTRACT

A tool includes a frame and a cutting bar mounted on the frame. The cutting bar includes a plurality of aligned cutting heads. The tool mounts on a punch block, and the cutting bar is selectively aligned with a row of connectors on the punch block and is pressed downwardly to press and cut a row of wires.

6 Claims, 4 Drawing Sheets

TOOL FOR INSTALLING WIRES ON A PUNCH BLOCK

BACKGROUND OF THE INVENTION

The present invention relates to tools for connecting wires to a punch block, and, in particular, to a tool which can press and connect an entire row of wires on a punch block at once.

Punch blocks are commonly used for connecting telephone systems. A punch block is used to bring outside telephone lines into a building's phone system, and a punch block is used to connect the phones within a private phone system. There are standard punch blocks which have two or four rows of 25 connectors each, and the most common punch blocks have two or four rows of 50 connectors each. This means that there may be as many as 200 individual connections to be made on a single punch block.

In the prior art, the person who installs the phone system uses a tool, which is similar to a screw driver with a sharp point on the end, to push down each individual wire into its respective connector and cut off the end of the wire. While some people may develop the ability to perform this action quickly, for most people it is a very slow and tedious process, and the man-hours required to do the installation represent a substantial cost.

SUMMARY OF THE INVENTION

The present invention provides a tool which can push down and cut off an entire row of wires with a single action, thereby greatly reducing the amount of time required to connect a row of wires to a punch block.

The present invention provides a tool which includes a frame that locks onto the punch block. A cutter bar is mounted on the frame for movement relative to the frame, and the installer simply has to align the cutter bar with a particular row of connectors, pull down a handle, and all the wires on that row are pushed down and cut off. To go to the next row, the handle is released, the cutter bar is shifted horizontally to the next row of connectors, the handle is pulled down, and the next row of wires is pushed down and cut off. Thus, the present invention can perform in one simple action a result that previously required 25–50 separate actions.

DESCRIPTION OF THE PREFERRED EMBODIMENT

Figure 1:
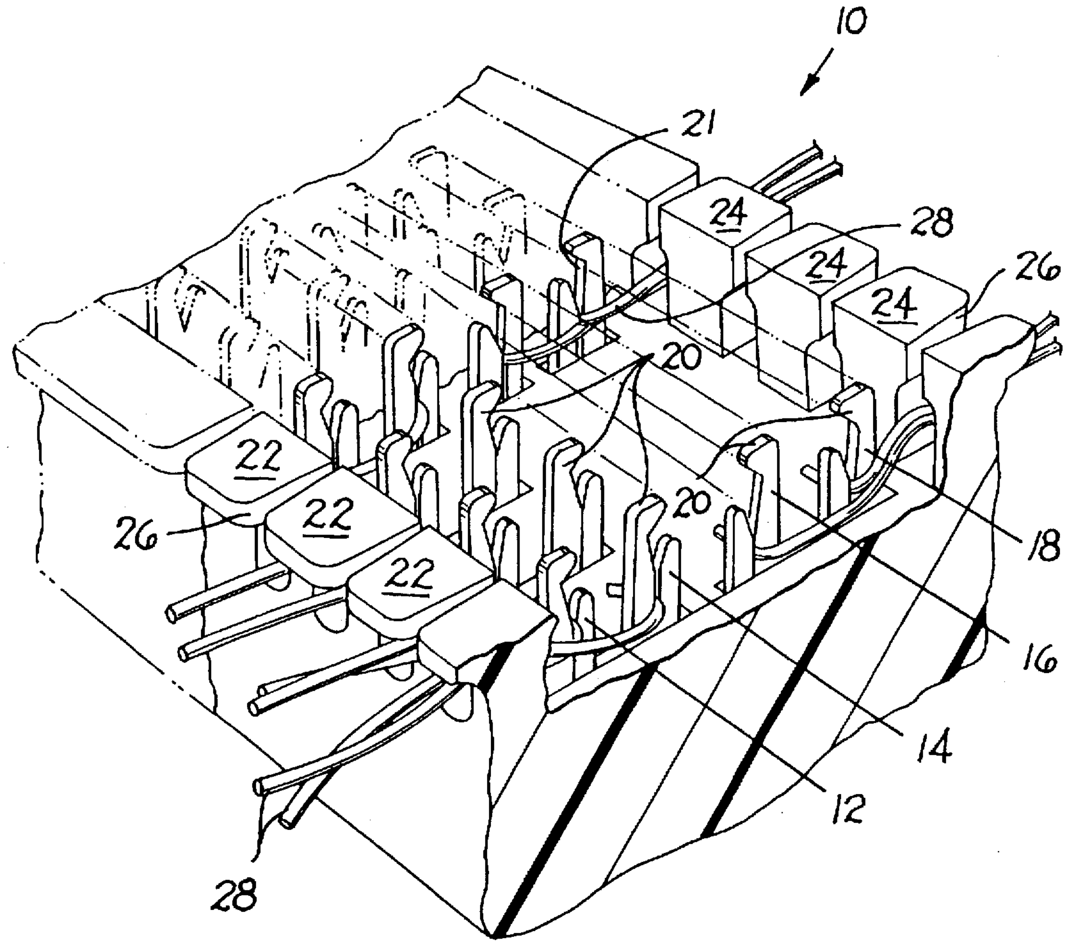
PRIOR ART FIG. 1
FIG. 1 is a broken-away schematic view of a punch block, which is known.

FIG. 1 is a broken-away, schematic view of a typical punch block, which is well-known in the art. The punch block 10 has four rows 12, 14, 16, 18 of connectors 20 mounted on it. Each connector 20 has a slot 21 into which a wire extends in order to connect the wire to the connector. The punch block 10 includes outwardly-projecting left ears 22 and outwardly-projecting right ears 24. The left and right ears 22, 24 lie along the same plane. There are spaces 26 between the ears through which the wires 28 extend.

Figure 2:
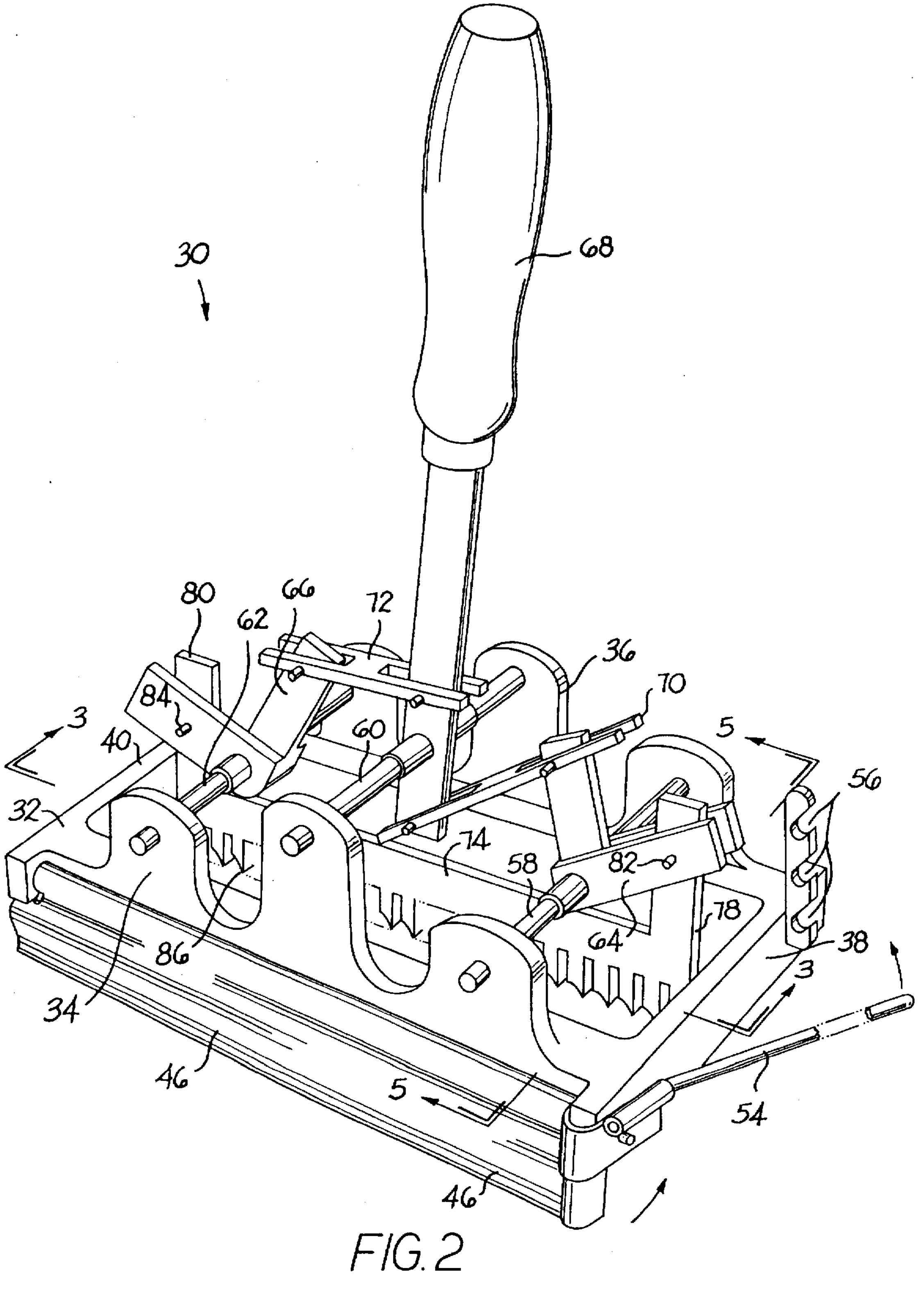
FIG. 2 is a perspective view of an embodiment of a tool made in accordance with the present invention.

FIG. 2 is a perspective view of a preferred embodiment of a tool 30 made in accordance with the present invention. The tool 30 is intended to be mounted on a punch block 10, as shown in FIG. 1, and to push down the wires into their respective connectors and cut off the ends of the wires. The tool 30 includes a rectangular frame 32, which includes a left side 34, a right side 36, a front side 38, and a back side 40.

Figure 5:
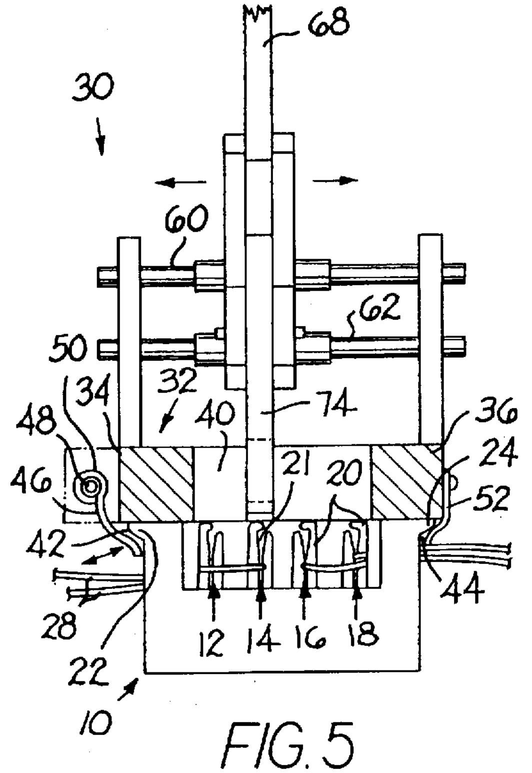
FIG. 5 is a view taken along the section 5—5 of FIG. 2, but with the tool mounted on a punch block.

The frame 32 defines a left slot 42 and a right slot 44, shown in FIG. 5, which mount on the left ears 22 and right ears 24, respectively, of the punch block 10. The left slot is formed by an elongated plate 46, which is pivotably mounted on the left side 34 of the frame 32 by means of a pin 48, which is mounted on the frame 32 in a front-to-back direction, and which extends through an elongated hole 50 in the elongated plate 46. In the prototype, shown here, the right slot 44 is formed by a second plate 52, mounted on the right side 36 of the frame 32. But the right slot 44 could simply be formed in the right side 36 itself when the frame 32 is formed.

There is an arm 54, which is mounted on the elongated plate 46, and which is used to pivot the plate 46 toward the center of the tool and away from the center of the tool. On the right side of the frame 32 is a plurality of receptacles 56, which receive the arm 54 to lock it in position. To mount the tool 30 on the punch block 10, the right slot 44 is wrapped around the right ears 24, and then the frame 32 is placed flat on the punch block 10, and the arm 54 is moved to pivot the elongated plate 46 toward the center of the tool 30, and is inserted into the appropriate receptacle 56, locking the tool 30 on the punch block 10.

There are three horizontal rods 58, 60, 62 mounted across the frame 32. Each of the rods 58, 60, 62 has one end mounted on the left side 34 of the frame and the other end mounted on the right side 36 of the frame. The forward rod 58 and rear rod 62 are mounted at the same elevation, and the center rod 60 is mounted at a higher elevation than the forward and rear rods 58, 62.

A forward linkage 64 is mounted on the forward rod 58, so that the forward linkage 64 can slide horizontally on the rod 58 and can pivot about the rod 58. Similarly, a rear linkage 66 is mounted on the rear rod 62 and can slide horizontally on the rod 62 and can pivot about the rod 62. A handle 68 is mounted on the center rod 60 and can slide horizontally on the rod 60 and can pivot about the rod 60. A first intermediate linkage 70 is pivotably mounted to the forward linkage 64 at its forward end and to the lower portion of the handle 68 at its back end. A second intermediate linkage 72 is pivotably mounted to the handle 70 above the rod 60 at its forward end and to the rear linkage 66 at its back end.

A cutter bar 74, having a plurality of cutting heads 76 aligned along a front-to-back plane, is mounted on the forward and rear linkages 64, 66. The cutter bar 74 has a forward arm 78 and a rear arm 80, each of which has a hole through it. A pin 82 extends through the hole in the forward arm 78 of the cutter bar 74 and through the forward portion of the forward linkage 64 to pivotably mount the cutter bar 74 on the forward linkage 64. A pin 84 extends through the hole in the rear arm 80 of the cutter bar 74 and through the rear portion of the rear linkage 66 to pivotably mount the cutter bar 74 on the rear linkage 66. This mounting arrangement permits the cutter bar 74 to be slid horizontally to the left or right to align it with a row 12, 14, 16, or 18 of connectors 20, and, when the handle is pivoted down, it causes the cutter bar 74 to move down, with all the cutting heads 76 simultaneously pushing down their respective wires 28 and then cutting off their respective wires 28.

Figure 3:
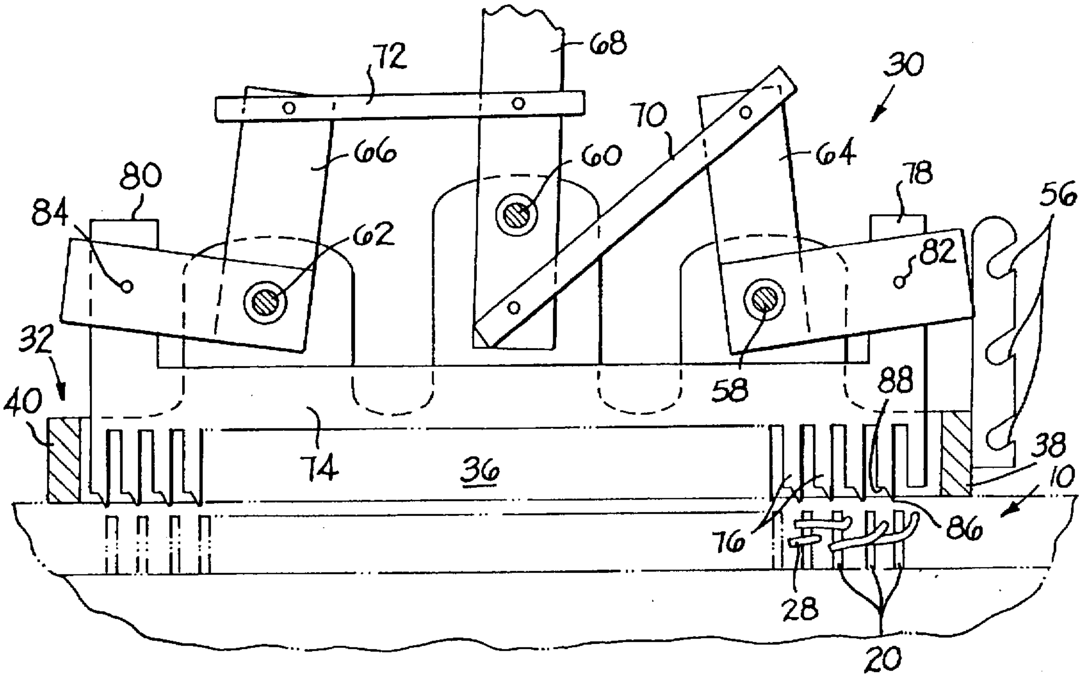
FIG. 3 is a view taken along the section 3—3 of FIG. 2.
Figure 4:
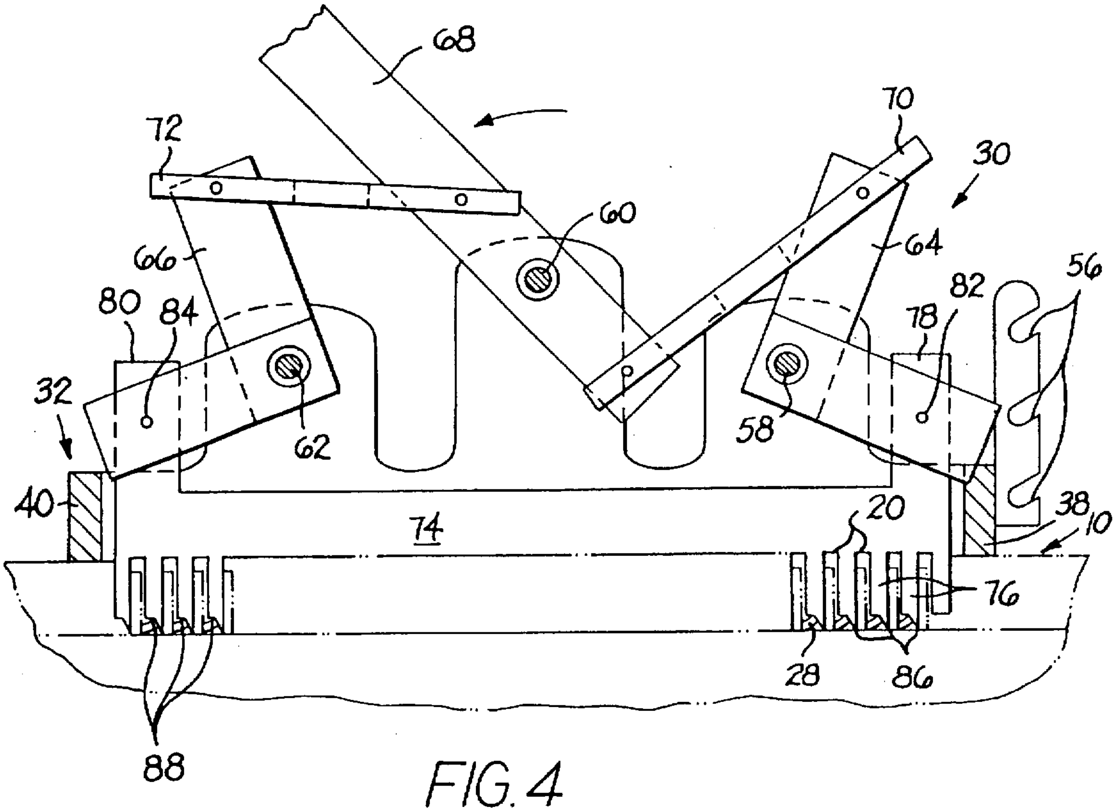
FIG. 4 is the same view as FIG. 3, but with the cutter bar moved down to cut off the wires.

FIG. 3 shows the tool 30 mounted on the punch block 10, with the cutting heads 76 in the "up" position. FIG. 4 shows the tool 30 with the cutter bar 74 moved down, so that the cutting heads have pushed down the wires 28 and have cut them off. It will be noted in FIGS. 3 and 4 that each cutting head 76 has a forward edge 86, which is very sharp and which is the edge that pushes and cuts the wire. Each cutting head 76 also has a rear edge 88, which terminates at a higher elevation than the forward cutting edge 86, so that, even when the cutter bar 74 is in the "down" position, a wire 28 can fit below the rear edge 88 of the cutting head 76 without being cut.

FIG. 5 shows the cutter bar 74 aligned with the second row 14 of connectors 20, and the arrows indicate that the cutter bar 74 can be shifted to the left or right in order to be aligned with the other rows.

Figure 6:
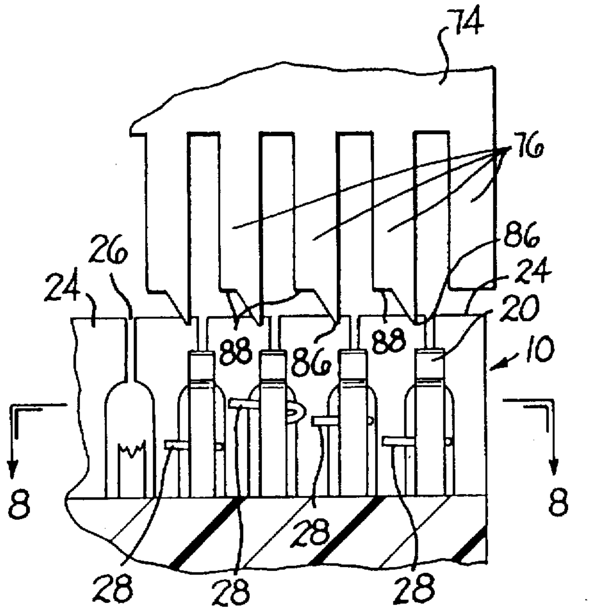
FIG. 6 is a broken-away side view showing the cutter bar of the tool of FIG. 2 moving down to push down and cut off a row of wires on the punch block of FIG. 1.
Figure 7:
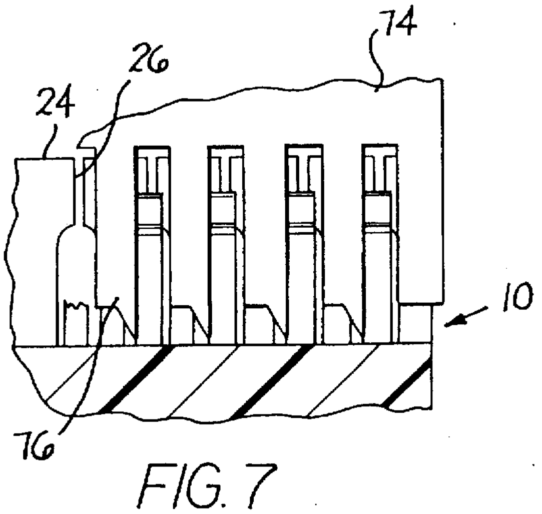
FIG. 7 is the same view as FIG. 6, but with the cutter bar in the lowered position.

FIG. 6 is an enlarged view, showing the wires 28 which have just been placed in the top portion of the connectors 20 and have not yet been pushed down. FIG. 7 shows the same view after the cutter bar 74 is shifted down and has pushed the wires 28 down in their connectors 20 and has cut off the ends of the wires.

Figure 8:
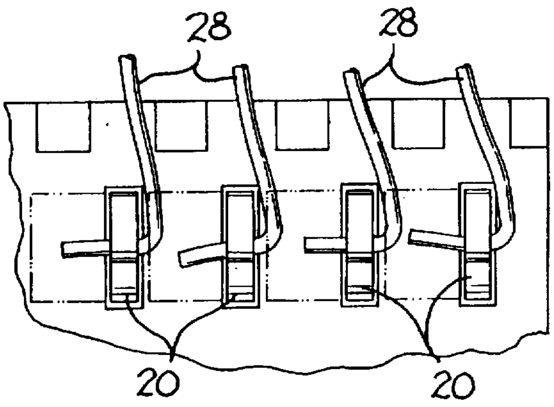
FIG. 8 is a view taken along the section 8—8 of FIG. 6.

FIG. 8 is a view looking down on the wires that are to be pushed down and cut off. The portion of the wires 28 that is cross-hatched is the portion that will be cut off by the cutting heads 76.

The preferred embodiment of the tool 30 that has been described here has twenty-five cutting heads 76 on the cutter bar 74, because the standard short punch block 10 has twenty-five connectors per row, and the longer punch block has fifty connectors per row, which would require the tool to be shifted lengthwise once in order to cover an entire row.

It will be obvious to those skilled in the art that modifications may be made to the embodiment described above without departing from the scope of the present invention.

What is claimed is:

1. A tool for installing wires on a punch block having left and right outwardly-projecting ears and having a plurality of rows of connectors, comprising:

a frame for mounting the tool on the punch block, said frame including left, right, forward and back sides; said left and right sides defining slots for receiving the left and right ears of a punch block;

a cutter bar mounted on said frame for movement by means that allow left and right and up and down movement relative to said frame; said cutter bar including a plurality of parallel cutting heads aligned along a front-to-back plane for pressing and cutting wires onto a row of the punch block;

wherein said cutter bar moves left and right relative to said frame for aligning the cutting heads with first one row of connectors and then with another row of connectors on the punch block without moving the frame relative to the punch block, and wherein said cutter bar moves up and down relative to said frame for pressing and cutting wires on a row of connectors.

2. A tool as recited in claim 1, wherein each of said cutting heads has a forward edge and a rear edge, and wherein said forward edge defines a sharp point, and said rear edge terminates at a point which is displaced upwardly from said sharp point.

3. A tool as recited in claim 2, wherein one of the sides of said frame includes an elongated plate which pivots relative to said frame along a forward-to-back axis, and wherein, when said elongated plate is pivoted toward the cutting bar, it forms one of said slots for receiving the respective ear of the punch block.

4. A tool as recited in claim 3, and further comprising:

an arm mounted on said elongated plate; and a receptacle for receiving said arm to lock said arm in a fixed position so that, when the elongated plate is pivoted toward the cutting bar to lock the tool on the punch block, the arm is inserted into the receptacle to hold the elongated plate in that pivoted position.

5. A tool as recited in claim 4, and further comprising a plurality of horizontal rods which are mounted across said frame in the left-to-right direction, wherein said cutting bar is mounted on said horizontal rods and slides left-to-right on said rods for selectively aligning with any of the rows of connectors on the punch block without moving the frame.

6. A tool as recited in claim 5, wherein said cutting bar includes forward and rear upwardly-projecting arms defining holes through said arms; and further comprising forward and rear linkages pivotably mounted on two of said horizontal rods and pivotably mounted to said forward and rear arms, respectively; and further comprising a handle defining a lateral hole through which extends one of said horizontal rods; said handle also being pivotably mounted to first and second intermediate linkages which, in turn, are pivotably mounted to said forward and rear linkages so that, when the handle is pivoted downwardly, it causes the cutting bar to move downwardly, with all the cutting heads approaching the punch block together.

* * * * *